(12) United States Patent
Miller

(10) Patent No.: US 7,114,281 B2
(45) Date of Patent: Oct. 3, 2006

(54) FISHING ROD HOLDER

(76) Inventor: Jeffrey Miller, 46537 Beaujardin, Macomb, MI (US) 48044

( * ) Notice: Subject to any disclaimer, the term of this patent is extended or adjusted under 35 U.S.C. 154(b) by 0 days.

(21) Appl. No.: 10/246,326

(22) Filed: Sep. 18, 2002

(65) Prior Publication Data

US 2003/0089021 A1    May 15, 2003

Related U.S. Application Data

(60) Provisional application No. 60/329,954, filed on Oct. 17, 2001.

(51) Int. Cl.
*A01K 97/10* (2006.01)

(52) U.S. Cl. ........................................ 43/21.2
(58) Field of Classification Search ................ 43/21.2; 248/514, 515; D22/147, 148
See application file for complete search history.

(56) References Cited

U.S. PATENT DOCUMENTS

| | | | |
|---|---|---|---|
| 3,724,791 A * | 4/1973 | Mason | ........................ 248/514 |
| 3,750,918 A | 8/1973 | Jensen | |
| 4,157,803 A | 6/1979 | Mack | |
| 4,527,349 A | 7/1985 | Emory, Jr. | |
| 4,869,195 A | 9/1989 | Eichfeld | |
| 4,876,980 A | 10/1989 | Bell, III | |
| 5,062,179 A | 11/1991 | Huang | |
| 5,142,809 A | 9/1992 | O'Brien et al. | |
| D332,299 S | 1/1993 | Dryna | |
| 5,299,773 A | 4/1994 | Bertrand | |
| D347,678 S | 6/1994 | McCann, Jr. et al. | |
| 5,367,815 A | 11/1994 | Liou | |
| 5,438,789 A | 8/1995 | Emory | |
| 5,478,041 A * | 12/1995 | Mayne | ........................ 248/514 |
| 5,662,306 A | 9/1997 | Dysarz | |
| 5,722,630 A * | 3/1998 | Chu | ........................ 248/514 |
| 5,761,844 A | 6/1998 | Horschel | |
| 5,871,196 A | 2/1999 | Martelli | |
| D414,239 S | 9/1999 | Lovelady | |
| 6,050,020 A | 4/2000 | Sizemore | |
| 6,052,937 A | 4/2000 | Morong | |
| 6,302,367 B1 * | 10/2001 | Ratza | ........................ 248/515 |

FOREIGN PATENT DOCUMENTS

DE          4000375    *  7/1990    ................ 43/21.2

* cited by examiner

*Primary Examiner*—Kurt Rowan
(74) *Attorney, Agent, or Firm*—Harness, Dickey & Pierce, PLC

(57) ABSTRACT

A fishing rod holding apparatus that can be mounted alone or in series to a vessel such as a boat, wherein the assembly includes a mounting base, a channel for receiving and attaching one or more fishing rod holding assemblies. Each rod-holding assembly comprises a fishing rod holding tube and a spring biased pivoting assembly. The pivoting assembly allows the angle of the fishing rod holder to be adjusted manually by depressing a button while simultaneously repositioning the rod holder. Once the desired angle is achieved, the assembly locks in position by simply releasing the button.

1 Claim, 4 Drawing Sheets

FISHING ROD HOLDER

CROSS-REFERENCE TO RELATED APPLICATIONS

This application claims the priority of U.S. Provisional Application No. 60/329,954, filed Oct. 17, 2001.

FIELD OF THE INVENTION

The present invention relates to a fishing rod holder. More specifically, the present invention relates to a boat mounted fishing rod holder that is manually adjustable to obtain a variety of rod angles and positions.

BACKGROUND OF THE INVENTION

There are many variations of fishing rod holders known in the art. These holders are generally used to hold a fishing rod and reel in a position allowing the fishing rod to be used without the need for the angler to hold it. Very often these holders are mounted to or near the stern of a boat for use during trolling operations. Additionally, anglers often do not care to hold the rod in their hands while fishing, even if the boat is not in motion, thereby allowing them to perform other tasks.

Several fishing rod holders have been developed that allow for the mounting of multiple fishing rods. U.S. Pat. No. 4,485,559 issued to Hawie, discloses a multi-rod holder mounted within a conventional rod holder already embodied on a boat. In this invention, the rods are maintained in an upright position, but there is no means for adjusting the position or angle of the fishing rods.

To the extent that there are a variety of adjustable fishing rod holders previously taught, the known prior art rod holders are difficult to manipulate and often times require tools to adjust their positions. One such type of cumbersome fishing rod holder requires a set screw for adjusting the preferred angle. These employ a screw or knob type fastener that, when tightened, frictionally maintains the holder at the desired position, as disclosed in U.S. Pat. No. 5,438,789 to Emory. To adjust the angle of the rod holder, a screwdriver or the like is required to loosen and tighten the set screw which may require the removal of a fishing rod from the holder. Other prior art uses a screw with a knob that can be turned by hand but often, with continued use, the knob wears and frequently breaks.

The need arose for a fishing rod holder that can be mounted alone or in a series, that allows for the angular adjustment without the need to turn a set screw. Insofar as known, there is no fishing rod holder that is relatively simple in construction that allows the angler to change the attitude of the fishing rod holder simply by depressing a button on the side of the holder, while at the same time locking the desired position as soon as the button is released, allowing the fishing rod holder to be selectively positioned at a range of increments between horizontal and vertical positions.

SUMMARY OF THE INVENTION

It is an object of the present invention to provide a fishing rod holder for mounting to a boat that is easy to adjust and economic to manufacture.

A further object of the present invention is to provide a mountable fishing rod holder to be used alone or in series that can be positioned in a variety of angles and subsequently locked to maintain desired position.

A more specific object of the present invention is to provide a fishing rod holder wherein the angle of the rod holder can be adjusted without turning a set screw or using separate tools.

A more specific object of the present invention is to provide a fishing rod holder wherein the position of the rod can be adjusted by depressing a spring activated button on the side of the rod holder.

A further object of the present invention is to provide a fishing rod holder that once adjusted to the desired angle by the user, it can be locked in position by simply releasing the button.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
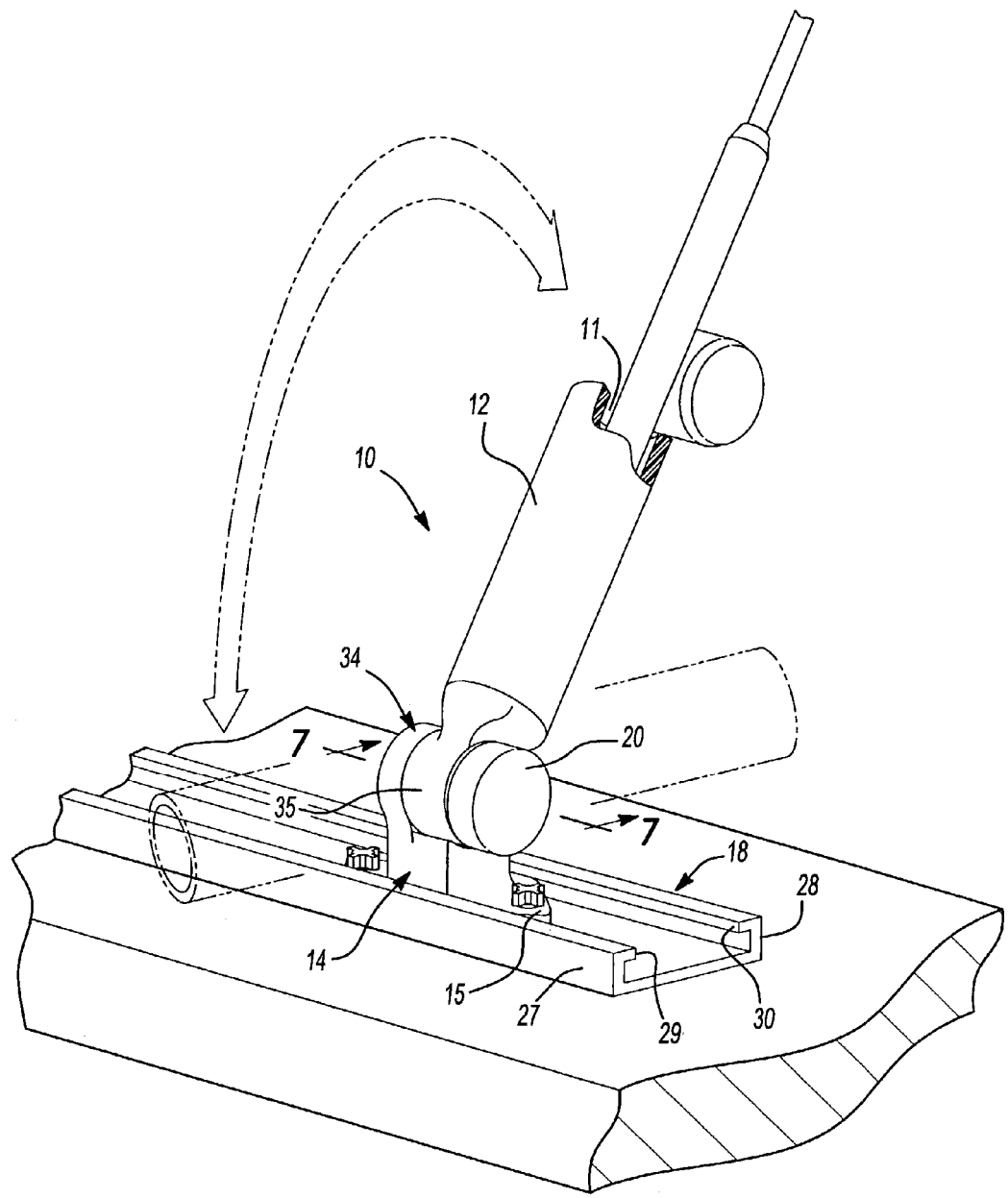
FIG. 1 is an elevated perspective view, partially broken away, of the fishing rod holder of the present invention.
Figure 2:
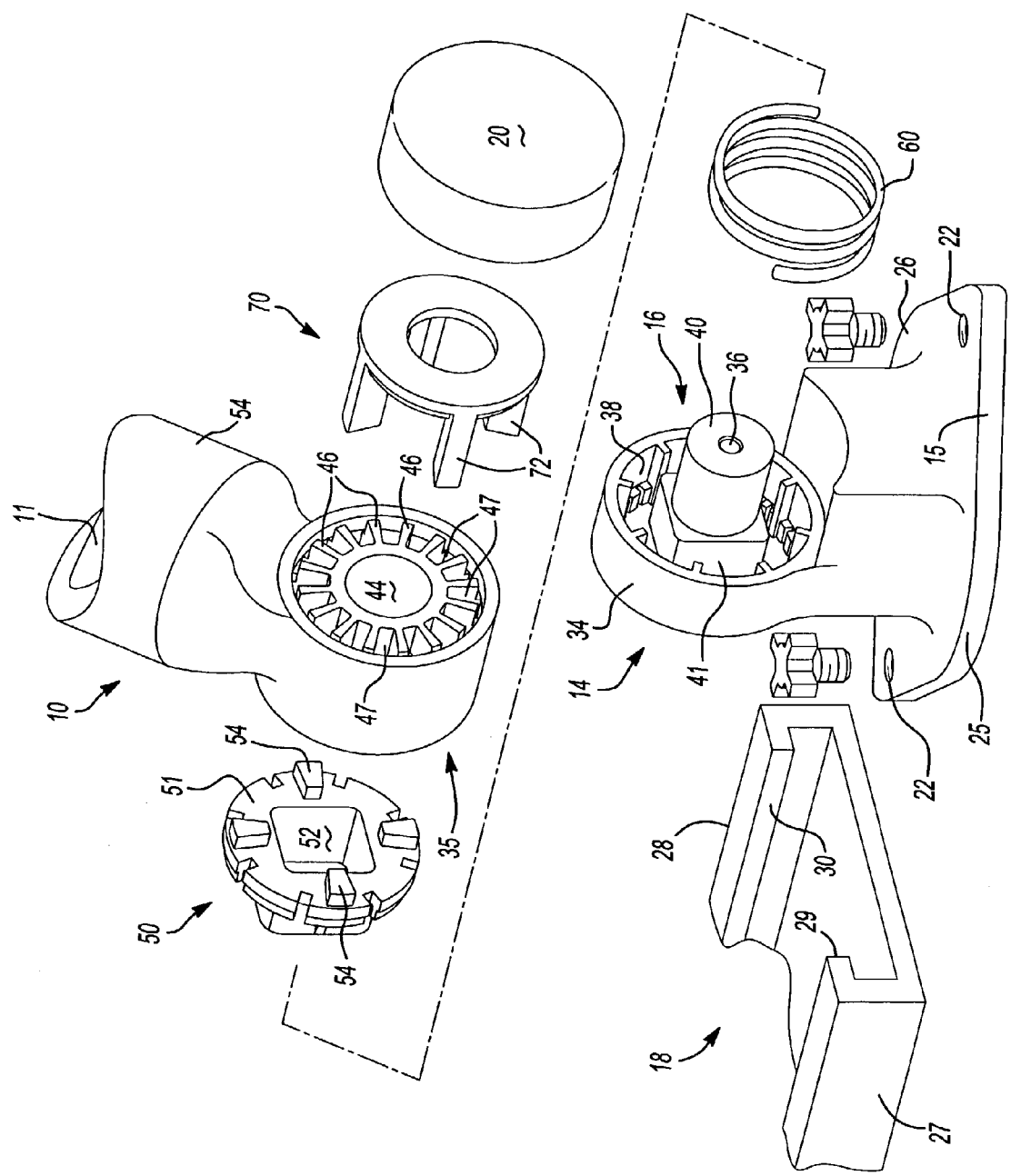
FIG. 2 is an exploded assembly view, partially broken away, of the adjustment assembly of the fishing rod holder of the present invention.
Figure 3:
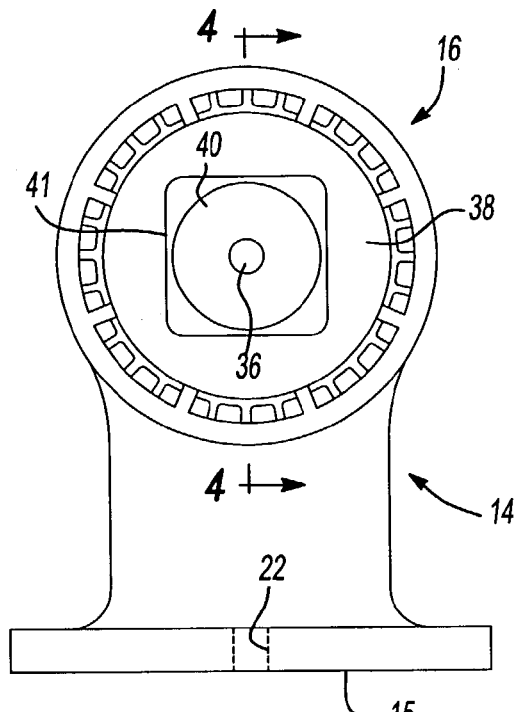
FIG. 3 is a side elevational view of a portion of the mounting structure of the fishing rod holder of the present invention.
Figure 4:
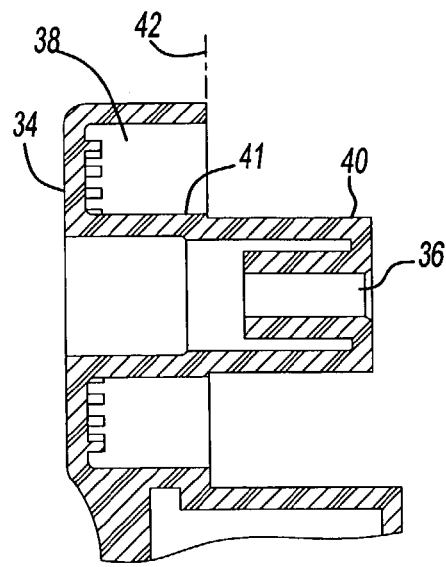
FIG. 4 is a transverse cross-sectional view taken substantially along the line 4—4 of FIG. 3.

The following description of the preferred embodiment(s) is merely exemplary in nature and is in no way intended to limit the invention, its application, or uses.

The improved fishing rod holder 10 is comprised of a fishing rod holding tube 12, a mounting base 14, and a pivot and locking mechanism 16 for adjusting the desired angle of the rod holder 10. The angle of the rod holder can be adjusted through an entire one hundred eighty degree range as desired by the user. The handle of the fishing rod is received within bore 11 of the holding tube 12. The mounting base 14 includes a plate lower portion 15 with integral sides 25 and 26 that are received in a channel member 18. The channel member is of a general C-shape in cross section and has integral first and second sides 27 and 28, and integral first and second flanges 29 and 30 beneath which sides 25 and 26 of the plate lower portion 15 are received. The channel member can be affixed to a variety of surfaces such as the transom of a boat by a plurality of screws or bolts, and is capable or receiving multiple rod holders 10 simultaneously.

The pivoting center 16 is comprised of a one-way moveable connection which allows the user to manually position the fishing rod holding tube 12, from a complete horizontal position through an entire vertical arc, to a complete horizontal position in the opposite direction. The desired angle of the fishing rod holding tube 12 is obtained by merely grasping the holding tube while simultaneously actuating a spring actuating element 20 positioned on the pivoting center 16. When the actuating element 20 is deactuated by the fisherman, the current angle of the fishing rod holding tube 12 will be maintained until further adjustment by the fisherman is desired, by actuating the spring actuating element 20.

The base plate 15 contains dual threaded holes 22 opposite the sides 25 and 26 for receiving set screws or bolts to frictionally hold the base plate 16 and respective fishing rod holder 10 in the desired location along the mounting track 18.

Integrated into the top of the base 14 is an offset vertical flange 34 of a general disk shape perpendicular to the plate lower portion 15 forming the stationary portion of the pivoting center 16. The vertical flange 34 defines a general bore 38 and an integrated axle or support shaft 40 with cylindrical aperture through bore 36 upon which corresponding cylindrical hub portion 35, integrated into the lower end of the fishing rod holding tube 12 is pivotally mounted. The integrated axle or support shaft 40 has a first portion 41 of a generally square shape extending to the contact plane 42 of vertical flange 34.

The hub 35, integrated in the fishing rod holding tube 12, contains a central cylindrical through bore 44 and a series of spokes 46 defining a plurality of angle adjusting through passages 47 surrounding the central aperture 44. The integrated support shaft 40 of the vertical flange 34 is received by the central aperture 44 for pivotal attachment thereto.

Figure 5:
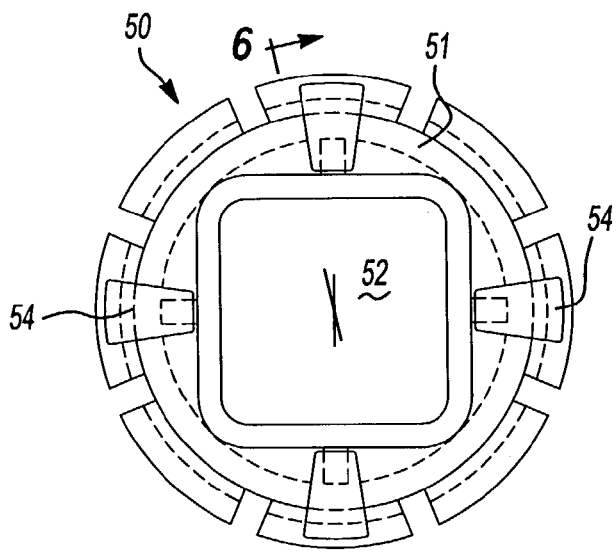
FIG. 5 is a side elevational view of the adjustment assembly of the fishing rod holder of the present invention.
Figure 6:
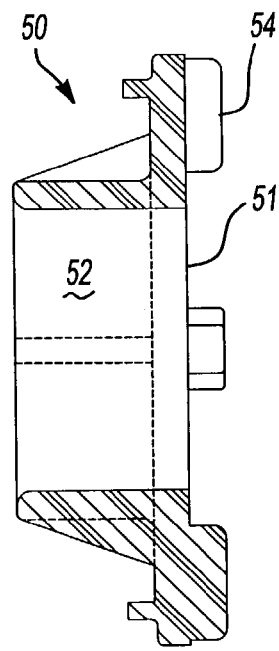
FIG. 6 is a transverse cross-sectional view taken substantially along the line 6—6 of FIG. 5.
Figure 7:
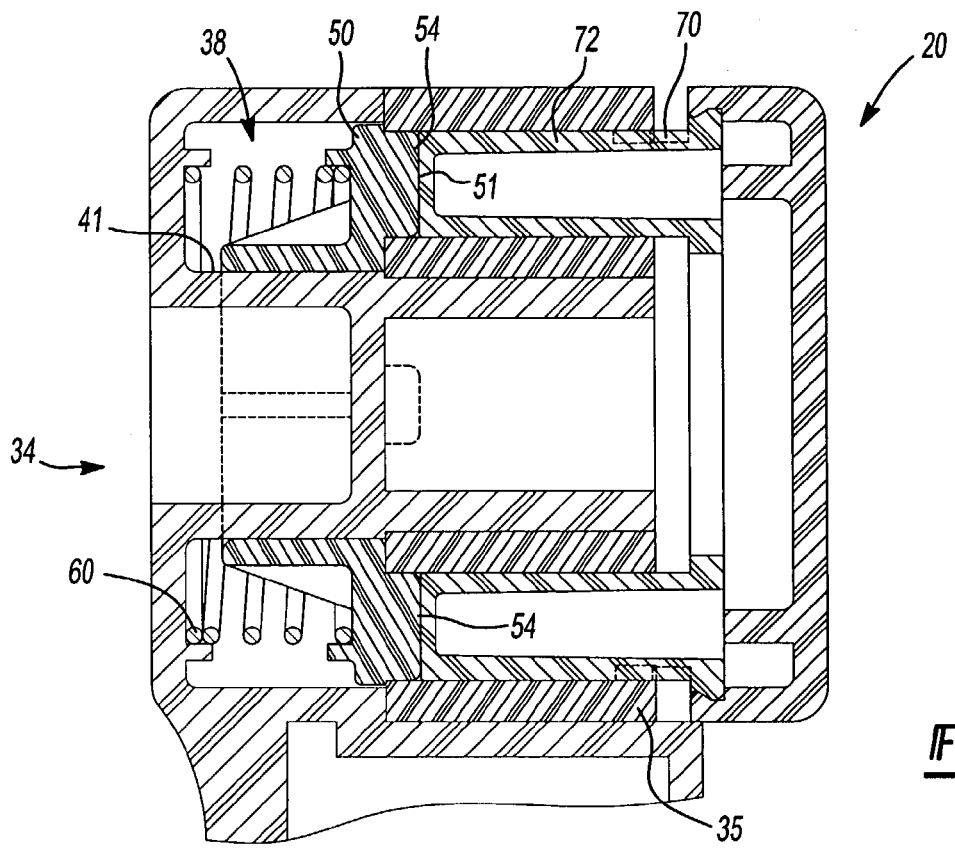
FIG. 7 is an enlarged transverse cross-sectional view of the adjustment mechanism of the fishing rod holder of the present invention.
Figure 8:
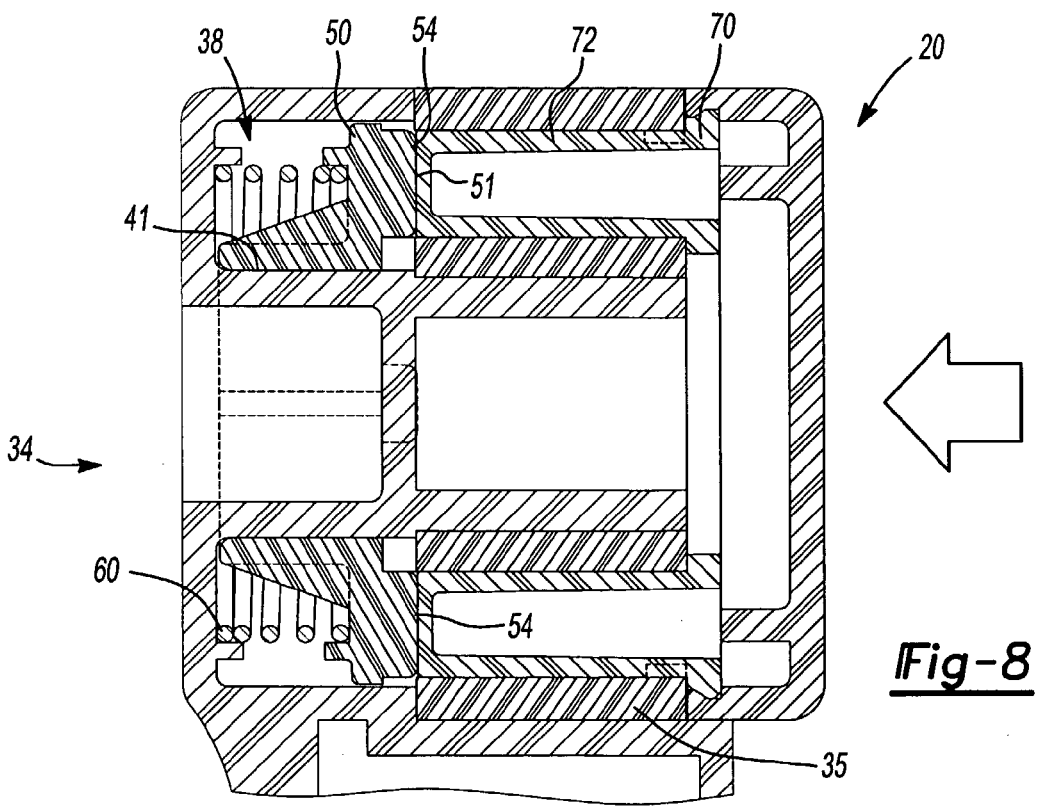
FIG. 8 is a transverse cross-sectional view similar to FIG. 7 with the adjustment mechanism biased to its closed or locked position.

Referring to FIGS. 5 and 6 together, FIG. 5 shows the end view of the locking element 50 of FIG. 6, showing the generally square shape of the locking element central aperture 52 which permits the locking element to be slidably, but non-rotatably mounted on the first portion 41 of the base 14.

Integrated within the pivoting center 16 is a locking element 50 with planar surface 51 and a generally square aperture 52 extending there through for receiving the first portion 41 of the support shaft 40. Surface 51 further comprises a plurality of locking lugs 54 corresponding to the angle adjusting through passages 47 of hub 35. In the deactuated position of the pivoting center 16, a coil spring 60 is positioned within the bore 38 for biasing the locking element 50 outwards towards the hub 35, thereby engaging the locking lugs 54 with the angle adjusting through passages 47.

A release element 70 is further implemented in the pivoting center 16 for forcing locking lugs 54 out of through passages 47 to allow adjustment of the hub 35, and the corresponding fishing rod holding tube 12. The release element 70 comprises a series of corresponding arms 72 that are received in through passages 47 of the hub from the opposite side of the locking lugs 54. The release element 70 is actuated by the user by depressing the spring actuating element 20. In doing so, the spring actuating element 20 pushes the release element arms 72 further through the through passages 47 of hub 35, in turn forcing the locking lugs 54 of the locking element 50 out of through passages 47 and compressing coil spring 60 against the vertical flange 34 within bore 38. At this point the user can manually pivot the hub 35 and corresponding fishing rod holding tube 12 by grasping the holding tube 12 and repositioning it to the desired position. Once the desired position is obtained, the user simply releases the spring actuating element 20 which is deactuated by the compressed coil spring 60, allowing the locking lugs 54 to once again be forced into the through passages 47 locking the new desired position of the fishing rod holding tube 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In combination in a fishing rod holder assembly for a marine vessel, an elongated C-shaped channel member fixedly secured to a generally horizontal surface of the vessel, said channel member having an upwardly facing channel defined between spaced parallel longitudinally disposed flanges, a mounting base having a lower portion slidably adjustably disposed within said channel and retained against upward movement by said flanges, whereby said mounting base and said fishing rod are adjustable longitudinally of said channel, locking screw means for releasably locking said mounting base in a preselected longitudinal position along said channel, amm a fishing rod holding tube member having a lower end and adapted to removably receive the handle portion of a fishing rod, said fishing rod holding tube member structurally connected to said mounting base by a one-hand operable pivot and locking mechanism, whereby the fishing rod is adjustable angularly relative to said mounting base, said one-hand operable pivot and locking mechhanism enabling adjusting and locking the relative angular position of said fishing rod holding tube member and the fishing rod mounted therein, whereby the operator can, with one hand, both release the locking mechanism and angularly pivot the fishing rod holding tube member and fishing rod to a preselected angular position relative to said base member, and thereafter, with the same one hand, the operator can lockingly secure said fishing rod holding tube member and fishing rod in said preselected angular position, said one-handed operable pivot and locking mechanism structurally connecting said fishing rod holding tube member to said mounting base by means of a cylindrical hub portion disposed on said lower end of said fishing rod holding tube member, said hub portion being formed with a cylindrical through bore and a plurality of circumferentially spaced through passages arranged radially outwardly from said through bore, a cylindrically-shaped support shaft formed on said base member and extending through said through bore of said hub portion and supporting said fishing rod holding tube member and fishing rod mounted therein for pivotal movement relative to said base member, a generally disk shaped locking element approximately the same diameter as said hub portion and disposed on one axial side thereof coaxially of said through bore, said locking element being axially slidably, but not rotatably, disposed on said base member and comprising a plurality of axially extending locking lugs complimentary in shape to the cross-sectional shape of said through passages, said locking lugs being circumferentially spaced around said locking element so that upon axial movement of said locking element toward the adjacent side of said cylindrical hub portion, said locking lugs will be aligned with and be received within the adjacent of said through passages to releasably lockingly secure said fishing rod holding tube member in a preselected angular position relative to said base member, a helical coil spring arranged coaxially of said support shaft between the axially outer side of said locking element and the axially inner side of said hub portion and resiliently biasing said locking element locking lugs toward locking engagement with said through passages of said hub portion, a release element disposed on the axially opposite side of said hub portion from said locking element and comprising a plurality of circumferentially spaced, axially extending release arms which each project axially through one of said through passages and have the axially terminal ends thereof engaged with said locking element, said release element having a central bore through which said support shaft extends, whereby said release element is rotatable about the axis of said support shaft with said fishing rod holding tube member and is axially movable relative to said base member between a first position, wherein said locking element is disposed directly adjacent to said hub portion and said locking lugs are received within and lockingly engaged with said through passages, and a second position wherein said locking element is axially displaced away from said hub portion against the biasing force of said coil spring, wherein said locking lugs are moved out of engagement with the associated of said through passages, thereby permitting said fishing rod holding tube member and associated fishing rod to be angularly adjusted relative to said base member, and a generally cylindrically shaped actuating element disposed on the axially outer side of said release element from said hub portion, said actuating element being axially displaceable to cause said release element to bias said locking element out of engagement with said hub portion against the bias of said helical coil spring, whereby said actuating element can be manually biased to effect unlocking and permit angular adjustment of said fishing rod holding tube member and the fishing rod mounted thereon with respect to said base member, and thereafter, said actuating element can be released to permit said coil spring to bias said locking element toward and into locking engagement with said hub portion to lockingly secure said holding tube member and fishing rod in a selected angular position, all with the use of just one hand of the operator.

* * * * *